United States Patent
Liu et al.

(10) Patent No.: US 9,733,766 B2
(45) Date of Patent: Aug. 15, 2017

(54) TOUCH-SENSING CIRCUIT STRUCTURE FOR A CAPACITIVE TOUCH PANEL

(75) Inventors: Chen-Yu Liu, Jhongli (CN); Ching-Yi Wang, Zhongli (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 0 days.

(21) Appl. No.: 13/257,311

(22) PCT Filed: Jul. 2, 2009

(86) PCT No.: PCT/CN2009/000751
§ 371 (c)(1),
(2), (4) Date: Sep. 19, 2011

(87) PCT Pub. No.: WO2010/108303
PCT Pub. Date: Sep. 30, 2010

(65) Prior Publication Data
US 2012/0012450 A1    Jan. 19, 2012

(30) Foreign Application Priority Data
Mar. 24, 2009    (CN) .......................... 2009 1 0129396

(51) Int. Cl.
G06F 3/044    (2006.01)
(52) U.S. Cl.
CPC .................... *G06F 3/044* (2013.01)
(58) Field of Classification Search
CPC   G06F 3/044; G06F 2203/04111; G08C 21/00
USPC .......................... 178/18.01–20.04
See application file for complete search history.

(56) References Cited

U.S. PATENT DOCUMENTS

| | | |
|---|---|---|
| 6,188,391 B1 | 2/2001 | Seely et al. |
| 7,705,834 B2 | 4/2010 | Swedin |
| 2005/0270039 A1 | 12/2005 | Mackey |
| 2006/0097991 A1* | 5/2006 | Hotelling ............. G06F 3/0416 345/173 |
| 2007/0247443 A1 | 10/2007 | Philipp |
| 2008/0136787 A1 | 6/2008 | Yeh et al. |
| 2008/0264699 A1* | 10/2008 | Chang et al. ............. 178/18.01 |
| 2009/0021267 A1 | 1/2009 | Golovchenko et al. |
| 2009/0128518 A1* | 5/2009 | Kinoshita ............... G06F 3/044 345/174 |

(Continued)

FOREIGN PATENT DOCUMENTS

| | | |
|---|---|---|
| CN | 1663124 A | 8/2005 |
| CN | 201078769 Y | 6/2008 |
| CN | 101261379 A | 9/2008 |

(Continued)

*Primary Examiner* — Lisa Landis
(74) *Attorney, Agent, or Firm* — Cooper Legal Group, LLC

(57) ABSTRACT

A circuit structure for capacitive touch panel is disclosed herein. The circuit structure for capacitive touch panel includes a plurality of metal leads and a plurality of electrode sensing blocks. Those electrode sensing blocks are isolated to each other and electrically connected to the metal leads. The electrode sensing blocks will output a plurality of capacitive signals in accordance with a plurality of touch positions. According to the electrode pattern structure described above, the impedance of the electrode structure can be decreased and the efficiency of the signal transmission can be improved and the sensibility of the touch panel can be increased.

20 Claims, 9 Drawing Sheets

(56) References Cited

U.S. PATENT DOCUMENTS

| | | | | |
|---|---|---|---|---|
| 2009/0146943 A1* | 6/2009 | Kim | .................. | G09G 3/342 345/102 |
| 2010/0164900 A1* | 7/2010 | Lin | .................. | G06F 3/044 345/174 |

FOREIGN PATENT DOCUMENTS

| | | | |
|---|---|---|---|
| CN | 101334702 | A | 12/2008 |
| EP | 1986084 | | 10/2008 |
| JP | 2007240479 | | 9/2007 |
| JP | 2007293865 | | 11/2007 |
| JP | 2008097283 | | 4/2008 |
| JP | 2008258805 | A | 10/2008 |
| JP | 2009009291 | | 1/2009 |
| KR | 20060129190 | | 12/2006 |
| KR | 20090011244 | | 2/2009 |
| WO | WO2005114369 | | 12/2005 |

* cited by examiner

TOUCH-SENSING CIRCUIT STRUCTURE FOR A CAPACITIVE TOUCH PANEL

BACKGROUND OF THE INVENTION

Field of the Invention

The present invention is related to a circuit structure for a capacitive touch panel, and more particularly is related to a circuit structure for a capacitive touch panel used to reduce the impedance of the circuit structure in the capacitive touch panel.

Description of the Prior Art

In recent years, the utilization of the capacitive touch panel is more and more popular, and it may replace the mouse in the future. The user doesn't need to spend too much time in learning how to use the mouse, and the fingers are used to replace the keyboard, the mouse and the touch pen, so that the user can instinctively and simply browse the interne, check email or operate other application software.

The conventional capacitive touch panel is coating a circuit structure, such as Indium Tin Oxide (ITO) or Antimony Tin Oxide (ATO), on a transparent glass. When the human finger touches the capacitive touch panel, the human finger will absorb a little current from the touch panel and the touch panel will calculate the percentage of the absorbed current to find the X-axis Y-axis coordinate of the touch location. The U.S. Pat. No. 6,961,049 discloses a circuit structure with two conductive ends in a capacitive touch panel, as shown in FIG. 1A and the U.S. Pat. No. 6,297,811 discloses a circuit structure with single conductive end in a capacitive touch panel, as shown in FIG. 1B. However, the impedances of the circuit structures in the prior arts described above are large enough to weaken the touch signal. Therefore, the touch signal transmitted in the touch panel will be affected and the touch location will be determined at the wrong position. The reliability of the touch panel will be decreased.

Therefore, there is a need to design a circuit structure to reduce the impedance of the circuit structure so as to increase the reliability of the touch panel.

SUMMARY OF THE INVENTION

The main object of the present invention is to provide a circuit structure of a capacitive touch panel used to reduce the impedance of the circuit structure.

The other object of the present invention is to provide a circuit structure of a capacitive touch panel used to enhance the signal transmitting accuracy of the touch panel.

According to the objects above, a circuit structure for capacitive touch panel is disclosed herein and includes at least one sensing electrode group. The sensing electrode group includes at least one metal lead; and a plurality of electrode sensing blocks. The electrode sensing blocks are electrically isolated to each other respectively and electrically connected to the metal leads, and output a capacitive signal in accordance with at least one touch position.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Some sample embodiments of the invention will now be described in greater detail. Nevertheless, it should be recognized that the present invention can be practiced in a wide range of other embodiments besides those explicitly described, and the scope of the present invention is expressly not limited except as specified in the accompanying claims.

Figure 1A:
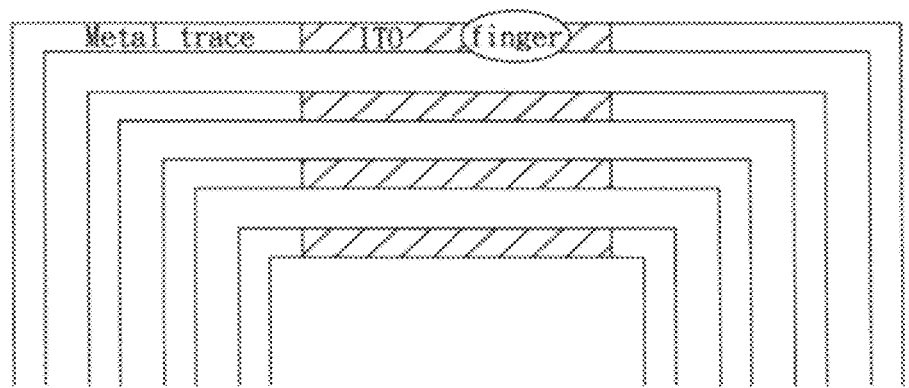
FIG. 1A and FIG. 1B are views showing that the conventional capacitive touch panel in the prior art.
Figure 1B:
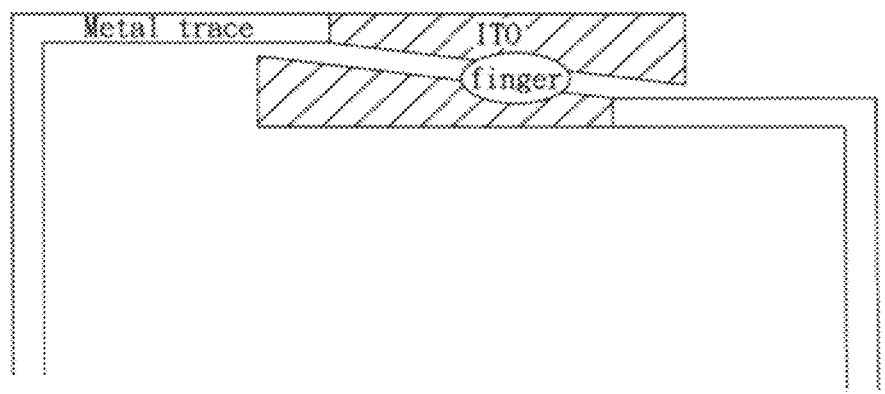
Figure 2A:
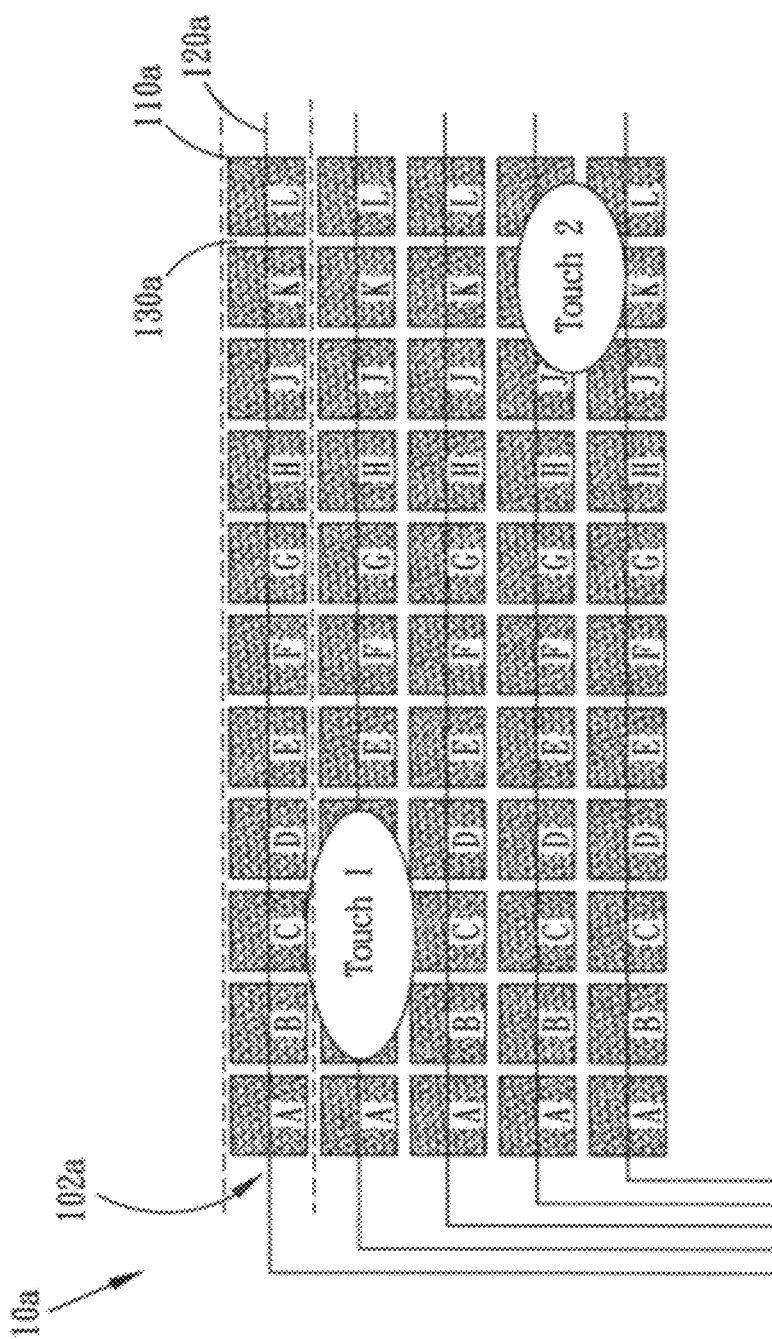
FIG. 2A and FIG. 2B are views showing that the first embodiment of the capacitive touch panel in the present invention.

FIG. 2A is a view showing that the first embodiment of the capacitive touch panel in the present invention. As shown in FIG. 2A, the circuit structure 10a of the capacitive touch panel includes at least one sensing electrode group 102a. Each of the sensing electrode groups 102a includes several electrode sensing blocks 110a and a low impedance metal lead 120a. Each of the electrode sensing blocks 110a includes the same surface area. The sensing electrode blocks 110a are electrically isolated to each other and each of the sensing electrode blocks 110a is electrically connected to the metal lead 120a. There are several intervals 130a with the same distance in the circuit structure 10a and each of the intervals is disposed between the electrode sensing blocks 110a. By cutting the circuit structure of the conventional capacitive touch panel to be several electrode sensing blocks, a low impedance metal lead 120a is then used to connect with each of the electrode sensing block 110a to be the circuit structure 10a of the capacitive touch panel in the present invention. Because the conventional circuit structure is an electrode structure with high impedance, it would cause the signal delay during the signal transmitting. The circuit structure is cut into several electrode sensing blocks 110a and the electrode sensing blocks 110a are electrically isolated to each other. And the low impedance metal lead 120a is used to stack with the electrode sensing blocks 110a in parallel to reduce the impedance during the signal transmitting so as to enhance the transmitting efficiency of the capacitive sensing signal. When touch 1 and touch 2 are touching on the electrode sensing blocks 110a, a capacitive touching signal will be generated in accordance with the different touch area and the different touch position.

Figure 2B:
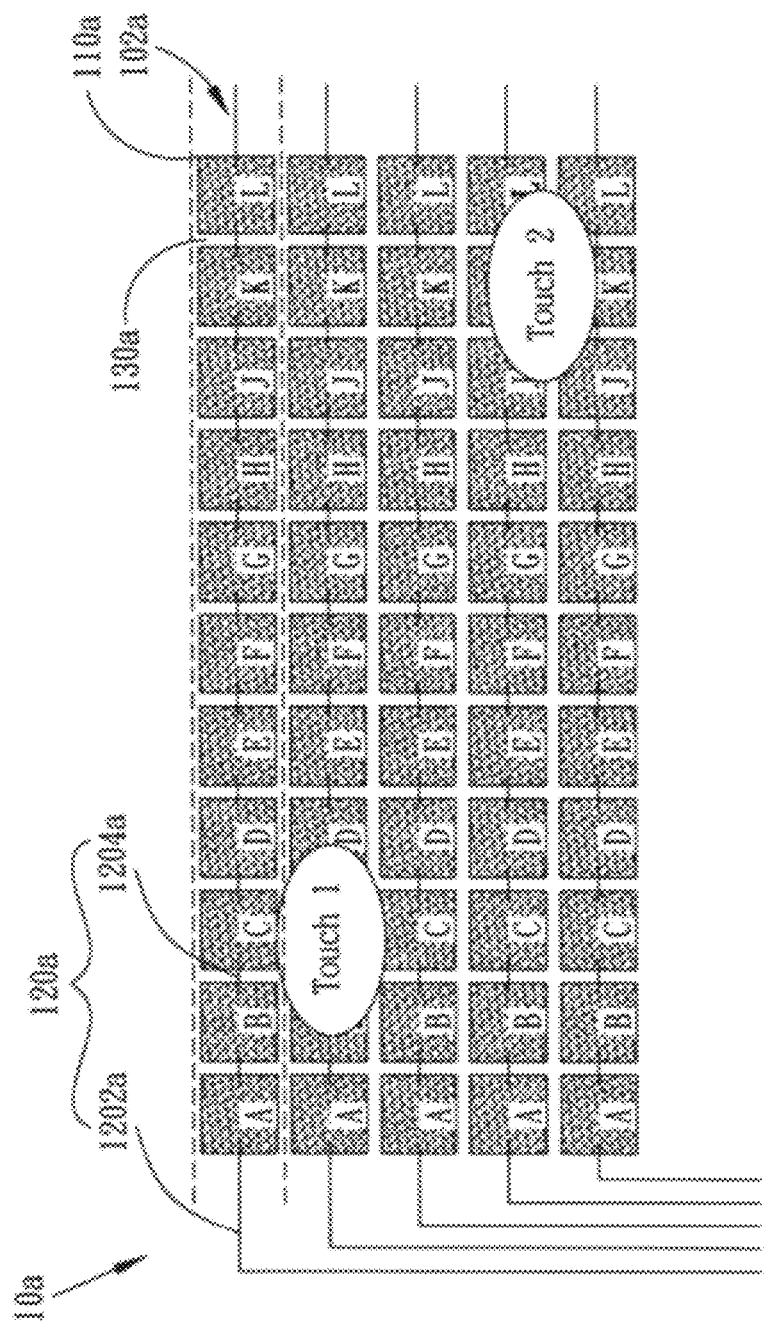

Moreover, the low impedance metal lead 120a in FIG. 2A will have different layout in another embodiment of the present invention, as shown in FIG. 2B. Comparing to the circuit structure 10a of the capacitive touch panel in FIG. 2A, the low impedance metal lead 120a is divided into the first low impedance metal lead 1202a and the second low impedance metal lead 1204a in the embodiment of FIG. 2B. The first low impedance metal lead 1202a is used to connect with the electrode sensing block 110a and the capacitive touch panel to output the capacitive signal. The second low impedance metal lead 1204a is used to connect with the electrode sensing blocks 110a. The signal transmitting impedance is decreased in accordance with the characteristic of the low impedance metal lead 120a and a lot of electrode sensing blocks 110*a* connected to each other so as to increase the transmitting efficiency of the capacitive touch signal.

Figure 3A:
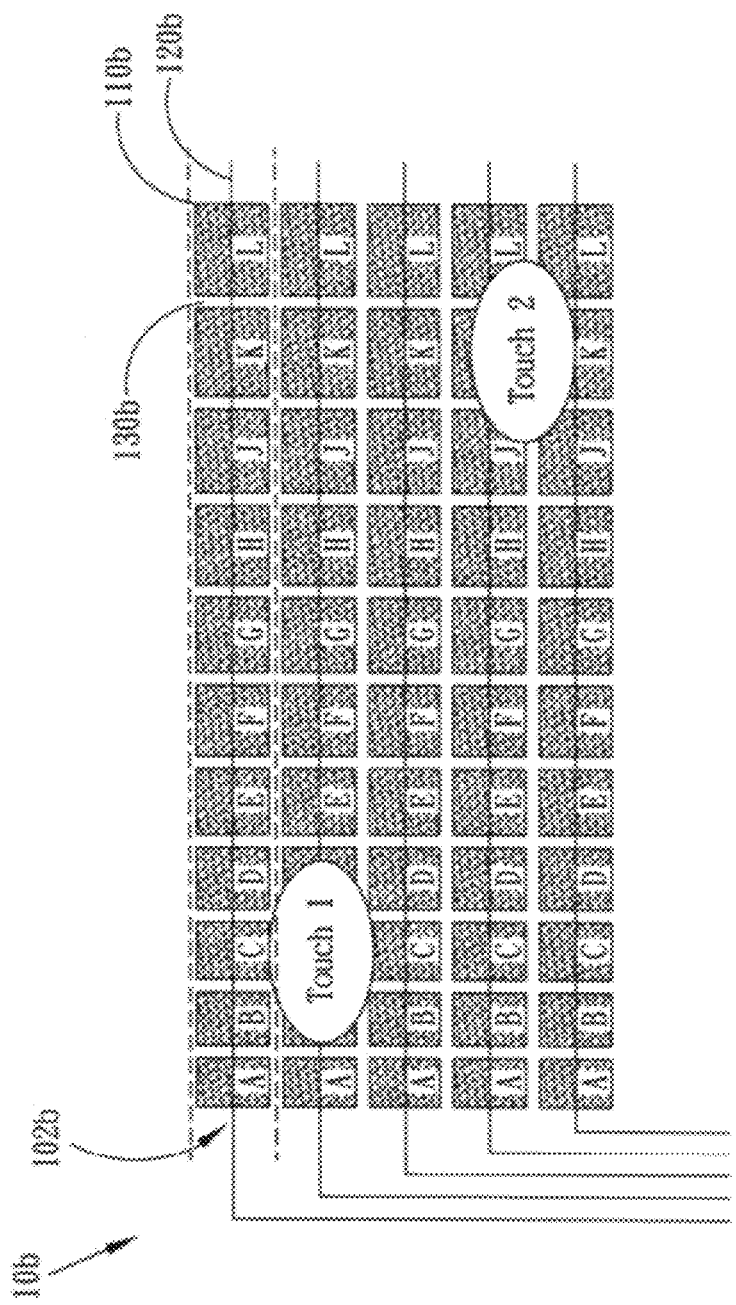
FIG. 3A and FIG. 3B are views showing that the second embodiment of the capacitive touch panel in the present invention.

FIG. 3A is a view showing the second embodiment of the capacitive touch panel in the present invention. As shown in FIG. 3A, the capacitive touch panel 10*b* in the present embodiment also includes at least one electrode sensing group 102*b*. Each of the electrode sensing groups 102*b* includes several electrode sensing blocks 110*b* and at least one low impedance metal lead 120*b*. Each of the electrode sensing blocks 110*b* includes the different surface area. The low impedance metal lead 120*b* is stacked over and connected to the electrode sensing blocks 110*b* in parallel. The electrode sensing blocks 110*b* are arranged in accordance with an arithmetic progression or a geometric progression. There are several intervals 130*b* with the same distance in the circuit structure 10*b* and each of the intervals 130*b* is also disposed between the electrode sensing blocks 110*b*. When touch 1 and touch 2 are touching on the electrode sensing blocks 110*b*, a capacitive touching signal will be generated in accordance with the different touch area and the different touch position.

Figure 3B:
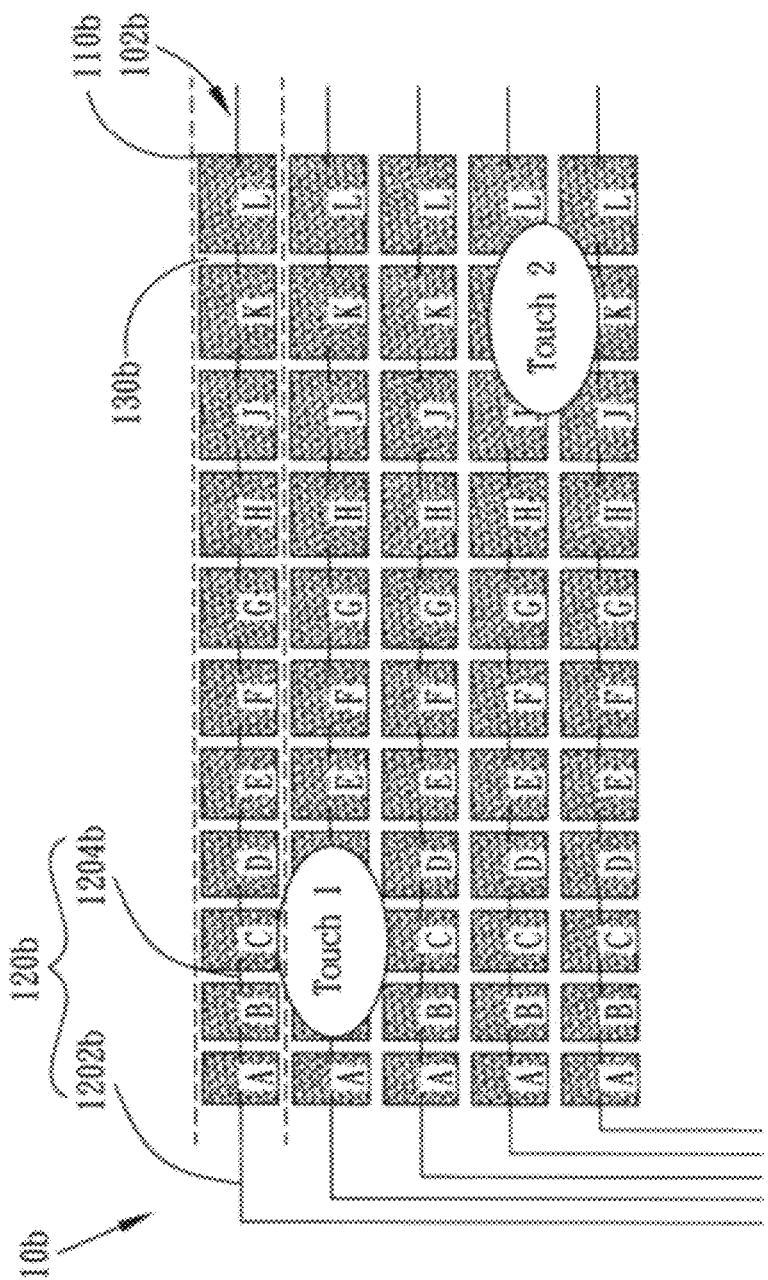

Moreover, the low impedance metal lead 120*b* in FIG. 3A will have different layout in another embodiment of the present invention, as shown in FIG. 3B. Comparing to the circuit structure 10*b* of the capacitive touch panel in FIG. 3A, the low impedance metal lead 120*b* is divided into the first low impedance metal lead 1202*b* and the second low impedance metal lead 1204*b* in the embodiment of FIG. 3B. The first low impedance metal lead 1202*b* is used to connect with the electrode sensing block 110*b* and the capacitive touch panel to output the capacitive signal. The second low impedance metal lead 1204*b* is used to connect with the electrode sensing blocks 110*b*. The signal transmitting impedance is decreased in accordance with the characteristic of the low impedance metal lead 120*b* and a lot of electrode sensing blocks 120*b* connected to each other so as to increase the transmitting efficiency of the capacitive touch signal.

Figure 4A:
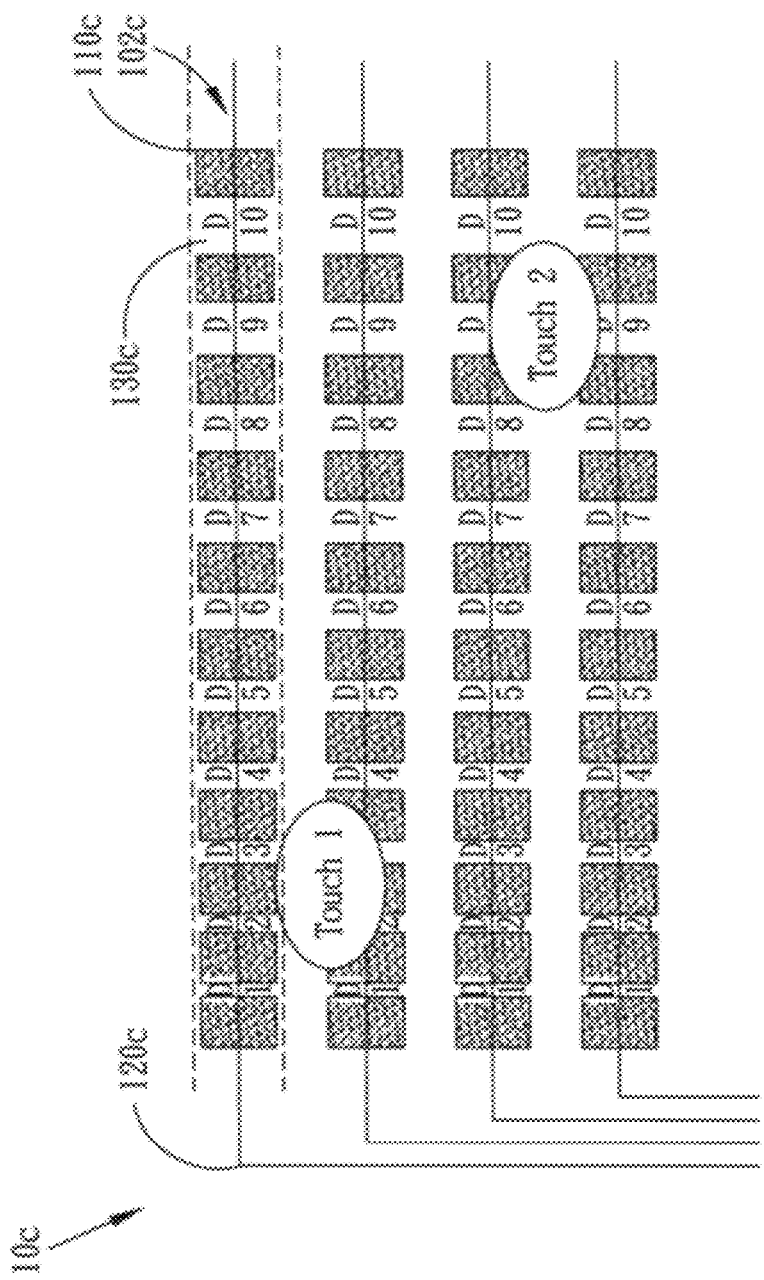
FIG. 4A and FIG. 4B are views showing that the third embodiment of the capacitive touch panel in the present invention.
Figure 4B:
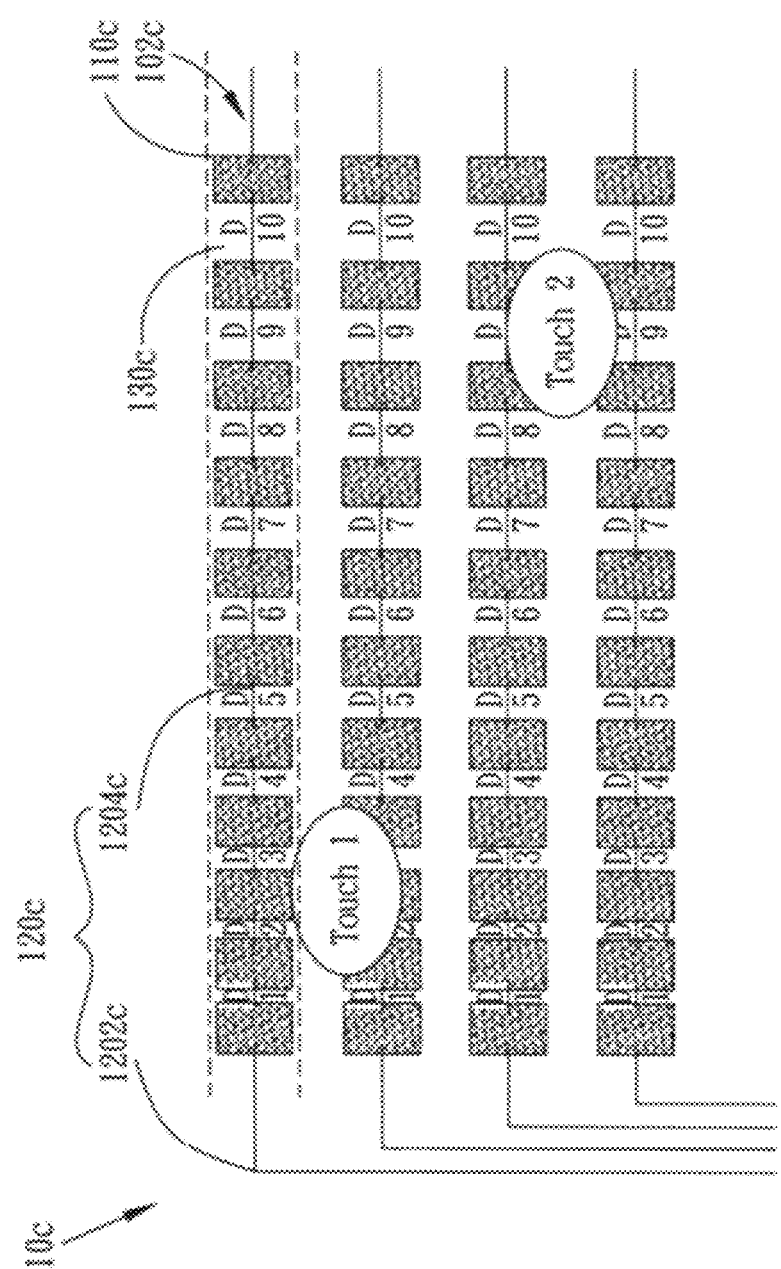

FIG. 4A is the third embodiment of the capacitive touch panel in the present invention. The circuit structure 10*c* in the capacitive touch panel of the present embodiment also includes at least one electrode sensing group 102*c*. Each of the electrode sensing group 102*c* includes several electrode sensing blocks 110*c*, a low impedance metal lead 120*c* and several intervals 130*c* disposed between the electrode sensing blocks 110*c*. The electrode sensing block 110*c* and the low impedance metal lead 120*c* are stacked together and connected in parallel. By cutting the circuit structure of the capacitive touch panel to be several electrode sensing blocks 110*c*, the characteristic of the low impedance metal lead 120*c* and the layout of stacking the electrode sensing block 110*c* and the low impedance metal lead 120*c* are used to reduce the signal transmitting impedance so as to enhance the transmitting efficiency of the capacitive sensing signal. By comparing with the first embodiment and the second embodiment, each of the electrode sensing blocks 110*c* includes the same surface area, but the interval 130*c* are of different distance. The intervals 130*c* with different distance are arranged in accordance with an arithmetic progression or a geometric progression. The low impedance metal lead 120*c* is also connected with the electrode sensing blocks 110*c* and the intervals 130*c* to be the circuit structure 10*c* of the capacitive touch panel. When touch 1 and touch 2 are touching on the electrode sensing blocks 110*c*, a capacitive touching signal will be generated in accordance with the different touch area and the different touch position. When the capacitive touching signal is generated, the X/Y axis location of the touch point can be calculated. In addition, it should be noted that, in a different embodiment, the low impedance metal lead 120*c* is able to connect with each of the electrode sensing blocks 110*c* and the circuit structure 10*c* of the capacitive touch panel as the layout shown in FIG. 4B. The low impedance metal lead 120*c* is divided into the first low impedance metal lead 1202*c* and the second low impedance metal lead 1204*c*. The first low impedance metal lead 1202*c* is electrically connected with the electrode sensing blocks 110*c* and used to transmit out the capacitive sensing signal. The second low impedance metal lead 1204*c* is electrically connected with the electrode sensing blocks. The signal transmitting impedance is decreased in accordance with the characteristic of the low impedance metal lead 120*c* and a lot of electrode sensing blocks connected to each other so as to increase the transmitting efficiency of the capacitive touch signal.

Figure 5A:
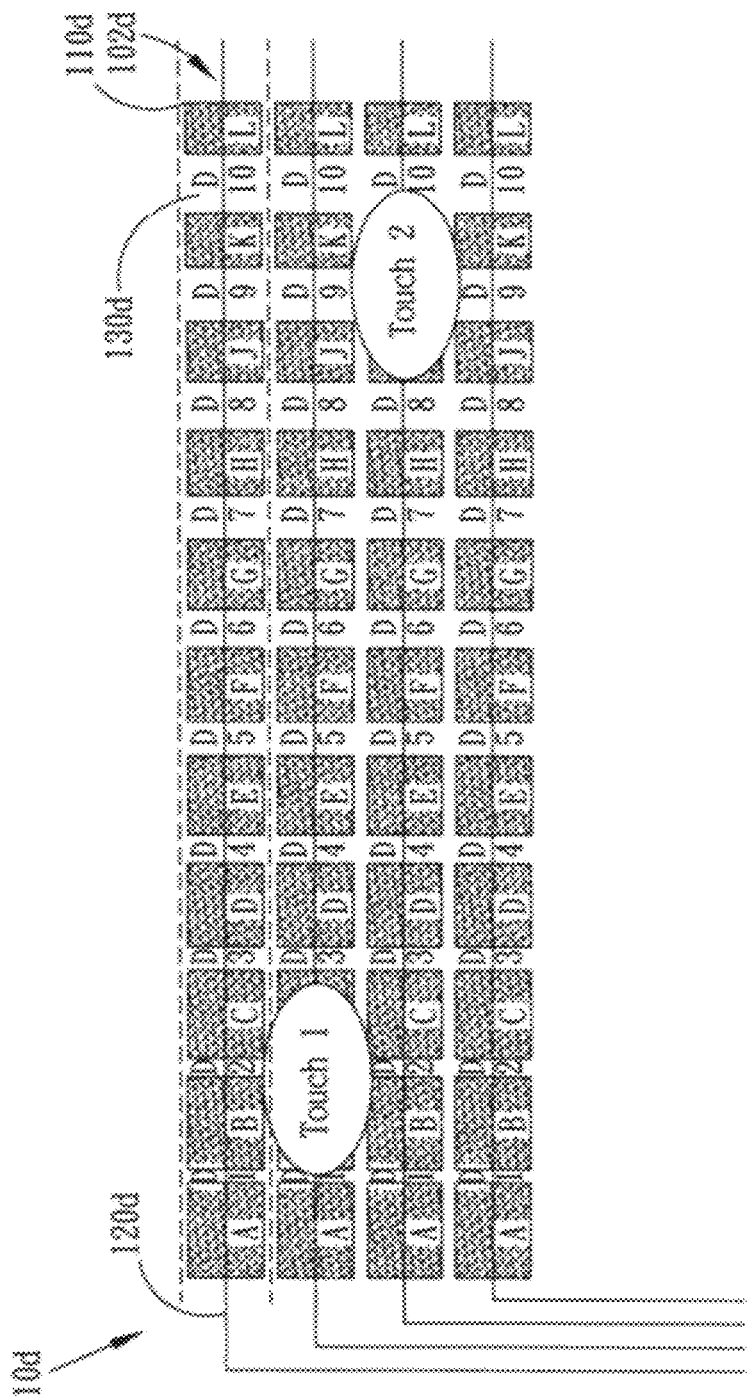
FIG. 5A and FIG. 5B are views showing that the fourth embodiment of the capacitive touch panel in the present invention.
Figure 5B:
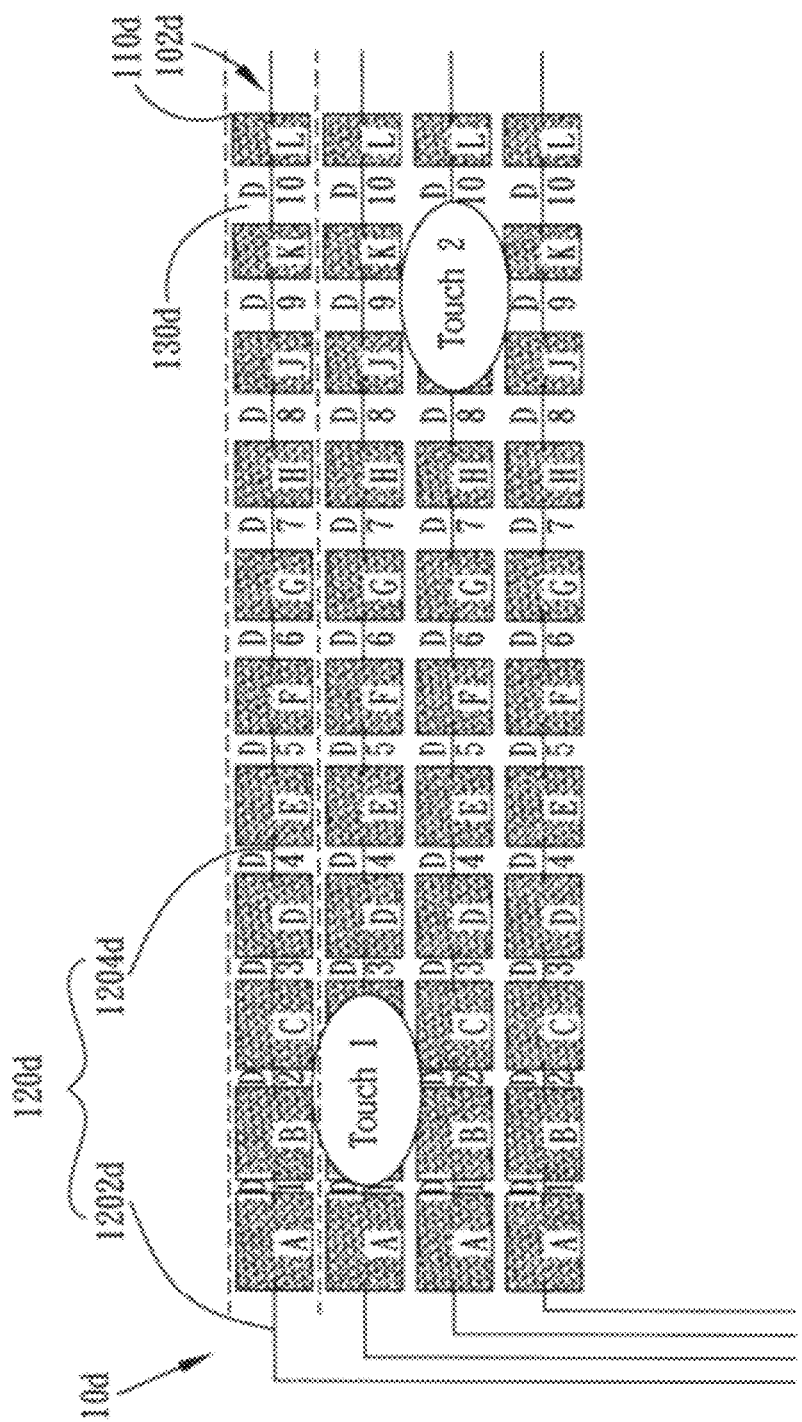

FIG. 5A is the fourth embodiment of the capacitive touch panel in the present invention. The circuit structure 10*d* in the capacitive touch panel of the present embodiment also includes at least one electrode sensing group 102*d*. Each of the electrode sensing group 102*d* includes several electrode sensing blocks 110*d*, several low impedance metal leads 120*d* and several intervals 130*d*. Each of the intervals 130*d* is disposed between the electrode sensing blocks 110*d*. The electrode sensing block 110*d* and the low impedance metal lead 120*d* are stacked together and connected in parallel. By cutting the circuit structure of the capacitive touch panel to be several electrode sensing blocks 110*d*, the characteristic of the low impedance metal lead 120*d* and the layout of stacking the electrode sensing block 110*d* and the low impedance metal lead 120*d* are used to reduce the signal transmitting impedance so as to enhance the transmitting efficiency of the capacitive sensing signal. Comparing with the previous embodiments, each of the electrode sensing blocks 110*d* includes different surface area and the intervals 130*d* are of different distance. The electrode sensing block 110*d* and the intervals 130*d* with different distance are arranged in accordance with an arithmetic progression or a geometric progression. The low impedance metal lead 120*d* is also connected with the electrode sensing blocks 110*d* and the intervals 130*d* to be the circuit structure of the capacitive touch panel 10*d*. By changing the surface area of the electrode sensing block 110*d* and the distance of the interval 130*d*, for example, the surface area of the electrode sensing block 110*d* is decreased and the distance of the interval 130*d* in each of the electrode sensing group 102*d* is increased from left to right (as shown in FIG. 5A). Because the touching area is different when the finger is touched on the capacitive touch panel, a capacitive touching signal will be generated in accordance with the different touch area and the different touch position. In addition, it should be noted that, in a different embodiment, the low impedance metal lead 120*d* is able to connect with each of the electrode sensing blocks 110*d* and the circuit structure 10*d* of the capacitive touch panel as the layout shown in FIG. 5B. The low impedance metal lead 120*d* is divided into the first low impedance metal lead 1202*d* and the second low impedance metal lead 1204*d*. The first low impedance metal lead 1202*d* is electrically connected with the electrode sensing blocks 110*d* and used to transmit out the capacitive sensing signal. The second low impedance metal lead 1204*d* is electrically connected with the electrode sensing blocks. The signal transmitting impedance is decreased in accordance with the characteristic of the low impedance metal lead 120*d* and a lot of electrode sensing blocks connected to each other so as to increase the transmitting efficiency of the capacitive touch signal.

The capacitive touch panels in the previous embodiments are the circuit structures with single conductive end. However, in different embodiments, the circuit structure of the capacitive touch panel is the circuit structure with dual conductive end. The electrode sensing block can be made by Indium Tin Oxide (ITO) but, in a different embodiment, the electrode sensing block in the present invention can be made by other chemical compound, such as Indium Zinc Oxide (IZO) and it is not limited herein. Moreover, it should be noted that the capacitive touch panel in the present invention is preferred to be a single layer capacitive touch panel. However, in a different embodiment, the capacitive touch panel can be a multi-layers capacitive touch panel and it is not limited herein.

Although specific embodiments have been illustrated and described, it will be appreciated by those skilled in the art that various modifications may be made without departing from the scope of the present invention, which is intended to be limited solely by the appended claims.

What is claimed is:

1. A circuit structure for a capacitive touch panel, comprising:
   a sensing electrode group, comprising:
      a metal lead; and
      a plurality of electrode sensing blocks, wherein:
         said plurality of electrode sensing blocks and said metal lead are stacked together,
         two of said plurality of electrode sensing blocks are spaced apart by a first interval with said metal lead electrically connected there between,
         another two of said plurality of electrode sensing blocks are spaced apart by a second interval,
         said first interval and said second interval are equal in distance,
         a first edge of each of said plurality of electrode sensing blocks are aligned and a second edge of each of said plurality of electrode sensing blocks are aligned,
         an area of each of said plurality of electrode sensing blocks is equal, and
         said sensing electrode group outputs a capacitive signal in accordance with at least one touch position.

2. The circuit structure of claim 1, wherein said sensing electrode group outputs said capacitive signal in accordance with said area of an electrode sensing block of said plurality of electrode sensing blocks covered by said touch position.

3. The circuit structure of claim 1, wherein said plurality of electrode sensing blocks are made of Indium Tin Oxide (ITO).

4. The circuit structure of claim 1, wherein said at least one metal lead comprises a first metal lead portion and a plurality of second metal lead portions.

5. The circuit structure of claim 1, wherein said sensing electrode group is disposed in both a touch area and a non-touch area at a peripheral of said touch area.

6. The circuit structure of claim 5, wherein said metal lead is disposed in said touch area and said non-touch area.

7. The circuit structure of claim 6, wherein said plurality of electrode sensing blocks is disposed in said touch area.

8. The circuit structure of claim 7, wherein said metal lead, disposed in the touch area and the non-touch area, is opaque.

9. The circuit structure of claim 6, wherein said metal lead, disposed in the touch area and the non-touch area, is opaque.

10. The circuit structure of claim 5, wherein said plurality of electrode sensing blocks is disposed in said touch area.

11. A circuit structure for a capacitive touch panel, comprising:
    a sensing electrode group, comprising:
       a metal lead; and
       a plurality of electrode sensing blocks, wherein:
          said plurality of electrode sensing blocks and said metal lead are stacked together,
          two of said plurality of electrode sensing blocks are spaced apart by a first interval with said metal lead electrically connected there between,
          another two of said plurality of electrode sensing blocks are spaced apart by a second interval,
          said first interval is different in distance than said second interval,
          an area of each of said electrode sensing blocks is equal, and
          said sensing electrode group outputs a capacitive signal in accordance with at least one touch position.

12. The circuit structure of claim 11, wherein said sensing electrode group outputs said capacitive signal in accordance with said area of an electrode sensing block of said plurality of electrode sensing blocks covered by said touch position.

13. The circuit structure of claim 11, wherein said plurality of electrode sensing blocks are made of Indium Tin Oxide (ITO).

14. The circuit structure of claim 11, wherein said at least one metal lead comprises a first metal lead portion and a plurality of second metal lead portions.

15. The circuit structure of claim 11, wherein:
    said electrode sensing blocks are arranged along a first direction and are spaced apart by intervals along the first direction, including the first interval and the second interval, and
    a distance of said intervals varies along the first direction in accordance with an arithmetic progression or a geometric progression.

16. The circuit structure of claim 11, wherein said sensing electrode group is disposed in both a touch area and a non-touch area at a peripheral of said touch area.

17. The circuit structure of claim 16, wherein said metal lead is disposed in said touch area and said non-touch area.

18. The circuit structure of claim 17, wherein said plurality of electrode sensing blocks is disposed in said touch area.

19. The circuit structure of claim 18, wherein said metal lead, disposed in the touch area and the non-touch area, is opaque.

20. The circuit structure of claim 17, wherein said metal lead, disposed in the touch area and the non-touch area, is opaque.

* * * * *